Sept. 2, 1924.  
R. R. McCLURE  
1,506,938  
ELECTRICALLY OPERATED OIL CUP  
Original Filed Aug. 2, 1920
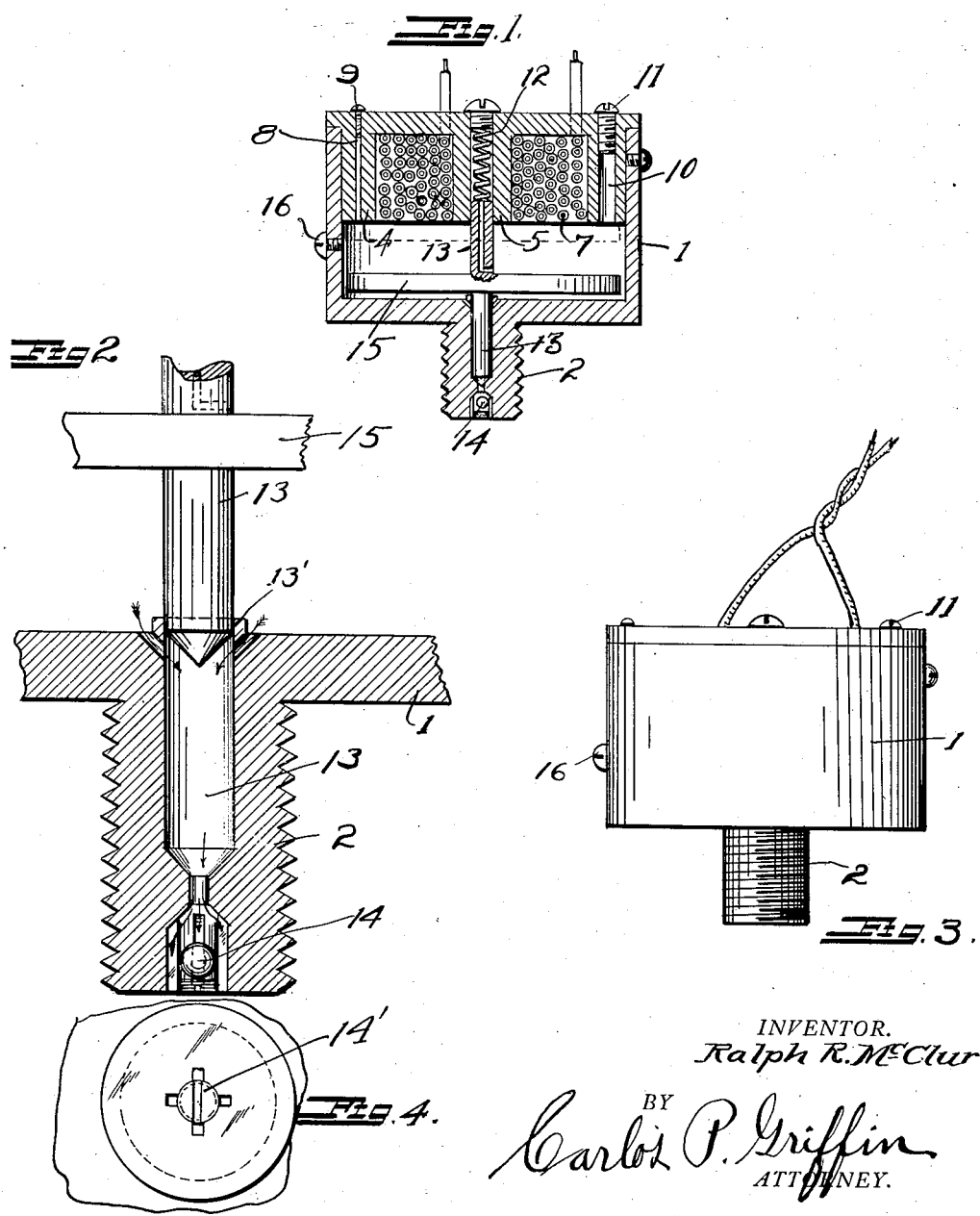
INVENTOR.  
Ralph R. McClure  
BY  
Carlos P. Griffin  
ATTORNEY.

Patented Sept. 2, 1924.

1,506,938

UNITED STATES PATENT OFFICE.

RALPH R. McCLURE, OF SAN FRANCISCO, CALIFORNIA, ASSIGNOR OF ONE-THIRD TO DAN J. NEE, OF SAN FRANCISCO, CALIFORNIA.

ELECTRICALLY-OPERATED OIL CUP.

Application filed August 2, 1920, Serial No. 400,838. Renewed July 1, 1924.

*To all whom it may concern:*

Be it known that I, RALPH R. McCLURE, a citizen of the United States, residing at 1250 O'Farrell St., San Francisco, in the county of San Francisco, State of California, have invented a new and useful Electrically-Operated Oil Cup, of which the following is a specification in such full and clear terms as will enable those skilled in the art to construct and use the same.

This invention relates to an electrically operated oil cup intended to be capable of discharging a small quantity whenever the user desires.

It will be understood by those skilled in the art that on an automobile and on many other types of machines there are bearings in places not easily accessible which must be periodically supplied with oil. If the cup must be turned down by hand it is often a great inconvenience, but with the present invention the buttons for the operation of the cups may be located in any convenient position and may be operated as often as the driver happens to think about it. This results in a better lubrication of the bearings because if the cups must be operated by hand they will often be allowed to go longer than they should, while if a convenient mode of operation is provided they will be more often operated and the better lubrication of the bearings will greatly reduce the wear thereon.

The lubricator comprises a cup 1 having a threaded stem 2 adapted to be screwed into a hole in the bearing cap. The cup is closed with an iron pole piece having the circular outer pole 4 and a central pole 5 around which is wound a coil of insulated wire 7.

The outer pole 4 has an air vent 8 covered with pivoted cap 9 and a filling hole 10 closed with the screw 11. The central pole has a hole to receive a spiral spring 12 and stem 13, said stem also extending into the threaded stem 2, at the bottom of which stem there is a small ball 14, to prevent the oil in the bearing from being drawn back into the oil cup. The ball is retained by a small screw 14'. The stem 13 is provided with an iron disk 15 rigidly secured thereto so that when the coil is energized the disk will be drawn up against the pressure of the spring 12 and a small quantity of oil will be allowed to pass into the bore of the stem 2 and when the current is cut off, the spring will force the stem down as shown in the sectional view discharging a few drops of oil into the bearing. The stem is retained in place when raised by a small boss 13'.

Where the cup cannot be used straight up it is turned so the air vent and screw 16 are on the upper side, thereby enabling the cup to be filled by the removal of said screw 16.

Suitable buttons for closing the circuit of the coil for all of the oil cups used, may be placed in any convenient place and they may be operated at will.

Other objects of the invention will appear as the description proceeds.

An embodiment of the invention is shown in the accompanying drawings in which the same reference numerals is applied to the same portion throughout but I am aware that there may be modifications thereof.

Figure 1 is a vertical sectional view of the oil cup.

Fig. 2 is a sectional view on a larger scale showing the plunger for feeding the oil.

Fig. 3 is a side elevation of the oil cup.

Fig. 4 is a plan view of the bottom of the oil cup stem, showing means for retaining the valve.

What I claim is as follows, but various modifications may be made in the construction shown in the drawings and above particularly described form, within the purview of my invention:

A force feed lubricator, comprising an oil cup, a cover therefor formed with an annular recess, an electro-magnet coil placed in said recess the cover having a central opening and a filling opening, a plunger operated in the central recess of the cover and in a central recess of the oil cup, a disk attached to the plunger, a check valve below the plunger, and a spring to force the plunger away from the electro-magnet after the latter has been once energized to expel oil from the oil cup.

In testimony whereof I have hereunto set my hand this 31st day of March A. D. 1920.

RALPH R. McCLURE.